United States Patent [19]
Sailor et al.

[11] Patent Number: 6,053,203
[45] Date of Patent: Apr. 25, 2000

[54] MECHANICALLY-DRIVEN PULSATING FLOW VALVE FOR HEAT AND MASS TRANSFER ENHANCEMENT

[75] Inventors: David J. Sailor, New Orleans; Daniel J. Rohli, Metairie, both of La.

[73] Assignee: Administrators of the Tulane Educational Fund, New Orleans, La.

[21] Appl. No.: 09/134,614

[22] Filed: Aug. 14, 1998

Related U.S. Application Data

[60] Provisional application No. 60/055,879, Aug. 15, 1997.

[51] Int. Cl.$^7$ ........................................ E03B 1/00
[52] U.S. Cl. ........................ 137/624.13; 137/624.15; 137/624.16
[58] Field of Search .................. 137/624.11, 624.13, 137/624.14, 624.15, 624.16; 251/129.11

[56] References Cited

U.S. PATENT DOCUMENTS

| | | |
|---|---|---|
| 3,937,252 | 2/1976 | Ishida . |
| 4,478,248 | 10/1984 | DeVall et al. ..................... 137/624.13 |
| 4,546,795 | 10/1985 | Okamoto et al. . |
| 4,649,955 | 3/1987 | Otto et al. . |
| 4,802,508 | 2/1989 | Styles et al. . |
| 4,881,574 | 11/1989 | Olson et al. . |
| 4,986,307 | 1/1991 | Hardee . |
| 5,148,946 | 9/1992 | Mizuta et al. . |
| 5,584,322 | 12/1996 | Poschl et al. ..................... 137/624.13 |

FOREIGN PATENT DOCUMENTS 29 16 085  of 1979  Germany .

OTHER PUBLICATIONS

Eibeck, P.A.; J.O. Keller; T.T. Bramlette; and D.J. Sailor (1993). "Pulse Combustion: Impinging Jet Heat Transfer Enhancement", *Combustion Science and Technology*, 94, (N1–6), 147–165.

Sailor, D.J. and B.K. Patil (1996). "Variable Duty Cycle Experiments in Pulsed–Impingement Heat Trasfer", Proceedings of the National Heat Transfer Conference, HTD–vol. 330 (8), pp. 37–42.

Barattini, V. and D.J. Sailor (1997). "Pulsed Impingement Heat Transfer Enhancement Between an Air Jet and a Heated Surface," Presented at the 1997 ASEE/GSW Annual Conference, Houston, Mar.

Sailor, D.J. (Jan. 5, 1998) "Innovative Solutions to High Heat and Mass Flux Requirements in Industrial Manufacturing and Drying Processes".

Rohli, D.J., and D.J. Sailor (1998). "Design and Implementation of a Pulsatile Flow Valve for Industrial Heat and Mass Transfer Applications," presented at the 1998 ASEE/GSW Annual Conference, New Orleans, Mar., pp. 515–518.

*Primary Examiner*—David J. Walczak
*Attorney, Agent, or Firm*—Garvey, Smith, Nehrbass & Doody, L.L.C.

[57] ABSTRACT

There are various methods for increasing heat transfer rates between a fluid jet (or array of jets) and an impingement surface. In a current investigation of pulsed flow impingement heat transfer, a pulsed jet with variable duty cycle impinging upon a heat transfer surface is capable of enhancing heat transfer relative to the heat transfer rate for steady flows. This principle is the subject of an in-depth experimental study. In the future this work will be extended to include numerical simulations. Potential applications include electronics cooling and drying processes in the manufacturing industry. Initial results indicate more than 50% heat transfer enhancement associated with control of the duty cycle parameter with a mechanical valve for use in industrial systems which is currently under development. Further experiments into boundary layer instability, and high frequency pulsations are under way.

26 Claims, 7 Drawing Sheets

$h = 2 * \text{radius} * \sin(DC * 90°)$
where $h$ = nominal passage diameter
and $DC$ = duty cycle.

FIG. 4

.25 Duty Cycle
h = 0.765 * radius

FIG. 5

.33 Duty Cycle
h = radius

FIG. 6

.5 Duty Cycle
h = 1.414 * radius

MECHANICALLY-DRIVEN PULSATING FLOW VALVE FOR HEAT AND MASS TRANSFER ENHANCEMENT

CROSS-REFERENCE TO RELATED APPLICATIONS

Priority of our U.S. Provisional Patent Application Ser. No. 60/055,879, filed Aug. 15, 1997, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to heat and mass transfer enhancement. More particularly, the present invention relates to flow valves for heat and mass transfer enhancement, with anticipated applications in manufacturing, materials processing, electronics cooling, and related industries.

2. General Background of the Invention

Pulsed flows can enhance heat and mass transfer. The reasons are (a) pulsed flows increase mixing and turbulence within the fluid stream, (b) pulsed flows can induce secondary flow structures such as vortex rings that form on the outside of the core of the fluid jet; (c) pulsed flows can result in cyclic formation of boundary layers resulting in thinner time-averaged boundary layers and hence increased driving potential for heat/mass transfer. Reason (a) above also helps to make the heat transfer more spatially uniform along the heat transfer surface. Thus, while steady impinging jets exhibit highly concentrated regions of heat/mass transfer, pulsed jets can provide for more uniform cooling/heating/drying of products (can avoid the "streaking" common in impingement drying processes). Frequency of pulsations is a variable known to influence heat and mass transfer enhancement, with higher frequencies generally producing more enhancement. The duty cycle is a new heat transfer design parameter introduced in this patent. Duty cycle is here defined as the ratio of the flow "on" time to total cycle time.

Attached are papers authored or co-authored by at least one of the inventors of the present invention which include more information about pulsed flows. Papers of interest include:

Eibeck, P. A.; J. O. Keller; T. T. Bramlette; and D. J. Sailor (1993). "Pulse Combustion: Impinging Jet Heat Transfer Enhancement", *Combustion Science and Technology*, 94, (N1-6), 147–165;

Sailor, D. J. and B. K. Patil (1996). "Variable Duty Cycle Experiments in Pulsed-Impingement Heat Transfer", Proceedings of the National Heat Transfer Conference, HTD-Vol. 330 (8), pp.37–42;

Barattini, V. and D. J. Sailor (1997). "Pulsed Impingement Heat Transfer Enhancement Between an Air Jet and a Heated Surface," Presented at the 1997 ASEE/GSW Annual Conference, Houston, March;

Sailor, D. J. (Jan. 5, 1998) "Innovative Solutions to High Heat and Mass Flux Requirements in Industrial Manufacturing and Drying Processes".

Rohli, D. J., and D. J. Sailor (1998). "Design and Implementation of a Pulsatile Flow Valve for Industrial Heat and Mass Transfer Applications," presented at the 1998 ASEE/GSW Annual Conference, New Orleans, March, pp. 515–518.

U.S. Pat. No. 3,937,252 to Ishida discloses pulses created by rotating sleeve—multiple pulses and phases, but no discussion of duty cycle—applications in generating pulse signals as a function of flow rate.

U.S. Pat. No. 4,802,508 to Styles et al. discloses a lavage system which creates pulsation by diverting the flow alternately through one of two different exit ports, unlike the present system which produces a single pulsed jet without discarding any fluid during the "off" portion of flow. Their system also delivers a "substantially sinusoidal varying pattern of pressure and flow . . ." The present system allows for careful control of the "duty cycle" of the flow profile.

U.S. Pat. No. 4,881,574 to Olson et al. discloses an air pulser for use with a solvent extraction pulse column. This design appears to charge a cavity with pressurized air and then discharge it in a periodic fashion. The physical mechanism is distinctly different from the present approach and the envisioned application is distinctly different.

U.S. Pat. No. 4,649,955 to Otto et al. discloses a distinctly different mechanical concept—plasma physics and laser applications.

U.S. Pat. No. 4,986,307 to Hardee discloses a rotary pneumatic valve, with applications for high-frequency pneumatic switching situations.

U.S. Pat. No. 5,148,946 to Mizuta et al. discloses delivery of predetermined amounts of fluids.

U.S. Pat. No. 4,546,795 to Okamoto et al. discloses a solenoid valve and discusses 'pulse width'—a concept similar to duty cycle—(but for purposes of minimizing "collision between valve and valve seat"). Frequency limits of solenoid valves are generally around 50 Hz—the mechanical valve of the present invention can be operated at much higher frequencies, and thus take advantage of the associated heat/mass transfer benefits of high frequencies.

Offenlegungsschrift 29 16 085 (West Germany 1979) discloses a slide valve.

All U.S. Patents and other references mentioned herein are incorporated herein by reference.

BRIEF SUMMARY OF THE INVENTION

The present invention includes a mechanically-driven valve that produces a pulsed flow of fluid useful for enhancing heat and mass transfer in applications such as tempering of metals, cooling of products, drying of paper/textiles/etc. It may be used on stationary targets or on manufactured products travelling along a conveyer belt system.

The present invention provides an apparatus for transferring mass and/or heat including a valve for a stream of fluid impinged upon a surface, the stream having a temporal jet velocity profile, the valve precisely pulsing and controlling the temporal jet velocity profile of the stream of fluid.

A single valve of the present invention may be used to generate a single stream of fluid. Multiple valves may be connected to mechanical drive trains in series and/or parallel arrangements to produce an array of pulsating fluid jets. This array may be arranged physically to produce a relatively uniform heat/mass transfer rate across a solid surface. Individual jets may also be out of phase with one another to aid in the heat/mass transfer.

The valve of the present invention is designed so that the valve insert determines the flow profile. The ratio of on-flow time to total cycle time is referred to herein as the "duty cycle". Absolute physical limits on the duty cycle ratio depend on the physical dimensions chosen for the valve and inlet/outlet ports.

Depending upon the anticipated flow conditions/ limitations, the duty cycle that produces the optimum heat/ mass transfer enhancement will differ. This duty cycle can be completely controlled by varying the valve insert without having to make any modifications to the housing. Hence, some guidelines can be developed to identify the best insert for a particular application. The flow conditions which will influence valve performance include total mass flow rate (or flow system pressure) rotational rate of the valve's mechanical driving mechanism, and the required distance between the flow nozzle and the heat/mass transfer impingement surface.

In contrast to many other pulsed flow devices this design allows for a small amount of leakage flow depending upon the machining tolerances between the valve insert and the housing. This leakage is along the direction of the flow path (onto the heat transfer surface), and therefore has no negative impacts for most applications. Instead, the "off" portion of the flow cycle may have a small residual velocity. In some applications (using gaseous working fluids) there may be slight additional leakage along the shaft. While this leakage has been found to be negligible, it can be completely eliminated by the addition of optional seals installed on either side of the bearings. In the present design there is sufficient material on the outside of the bearings to provide for the retrofit installation of seals if desired.

The valve of the present invention can be used with air or other fluid streams, such as liquid streams or other gases. It is useful in mass transfer applications, including drying, heating and cooling applications.

Valves controlled by solenoids are limited in frequency due to the charge times of the electromagnets. At high working pressures (flow rates), the charge times of solenoids are generally accentuated due to the large resulting torque on the valve piston. While using direct current solenoids avoids some of the obvious charging limitations of alternating current valves, all commercially available solenoid valves typically are limited to frequencies below 50 Hz (below 30 Hz for large flow rate applications). The mechanical valve of the present invention allows higher frequencies to be obtained and allows more precise control of the duty cycle. Solenoid valves being translational mechanical devices are also more prone to failure after large numbers of cycles. The valves of the present invention do not need to be computer controlled, and can thus be operated less expensively and perhaps more consistently as well.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
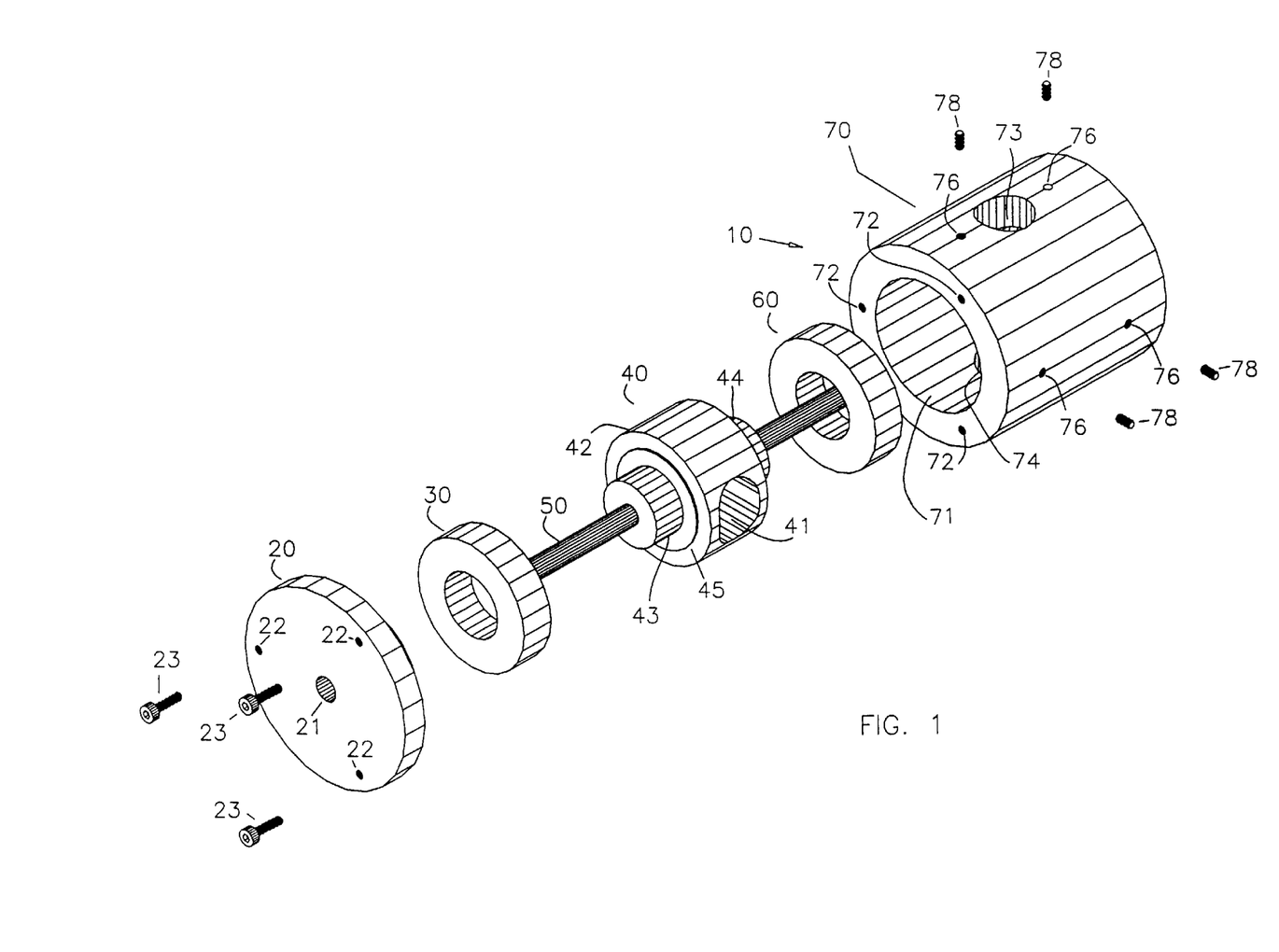
FIG. 1 is an isometric exploded view showing the valve of a preferred embodiment of the present invention.

FIG. 1 is an isometric exploded view showing the valve 10 of a preferred embodiment of the present invention. The valve 10 comprises an end cap 20, a bearing 30 (with an optional seal, such as CRWA5-V pressure seals commercially available from CR Seals), a valve insert 40 mounted on a shaft 50, a second bearing 60 (and optional seal), and a valve housing 70.

Figure 2:
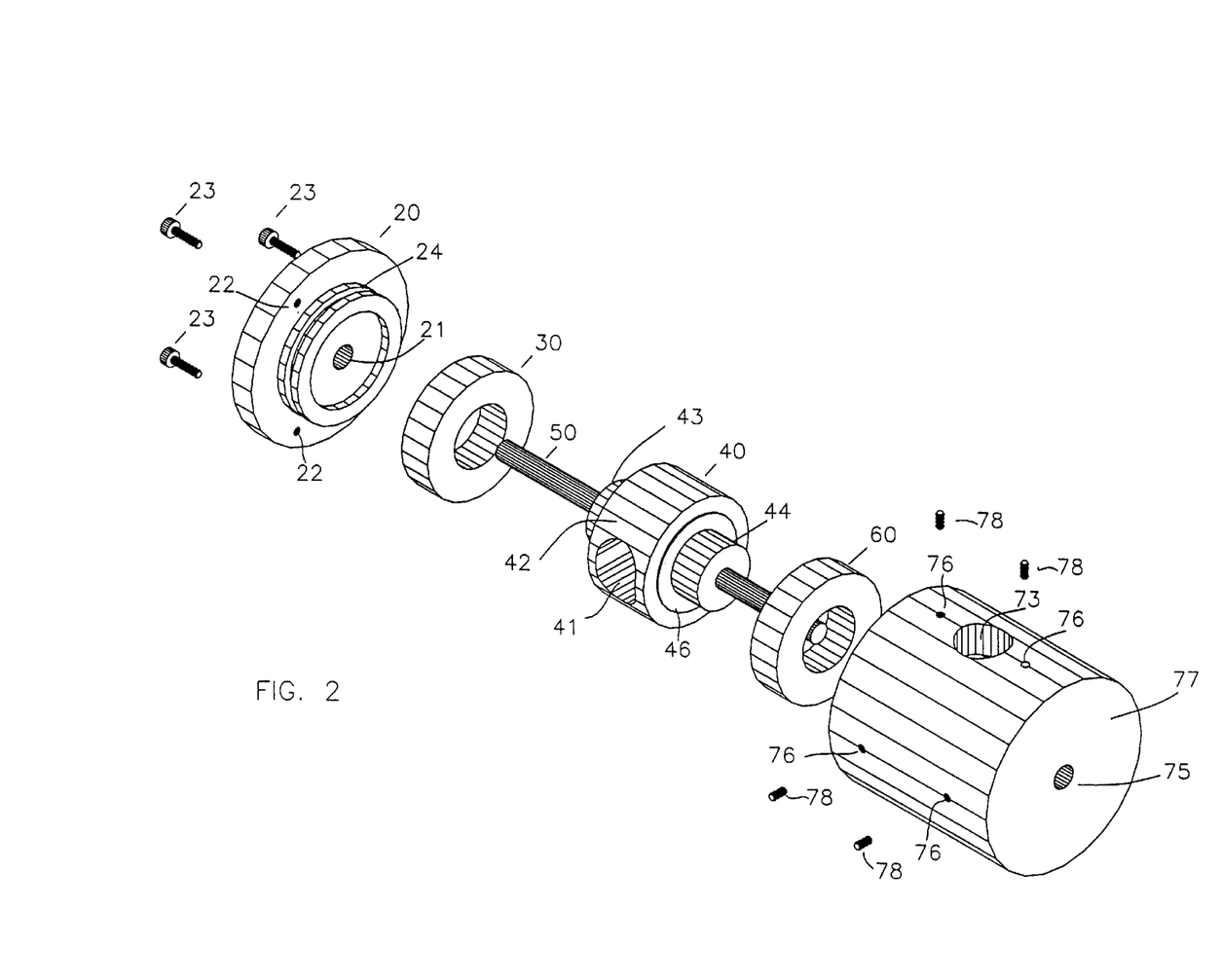
FIG. 2 is an isometric exploded view showing the valve of a preferred embodiment of the present invention.
Figure 3:
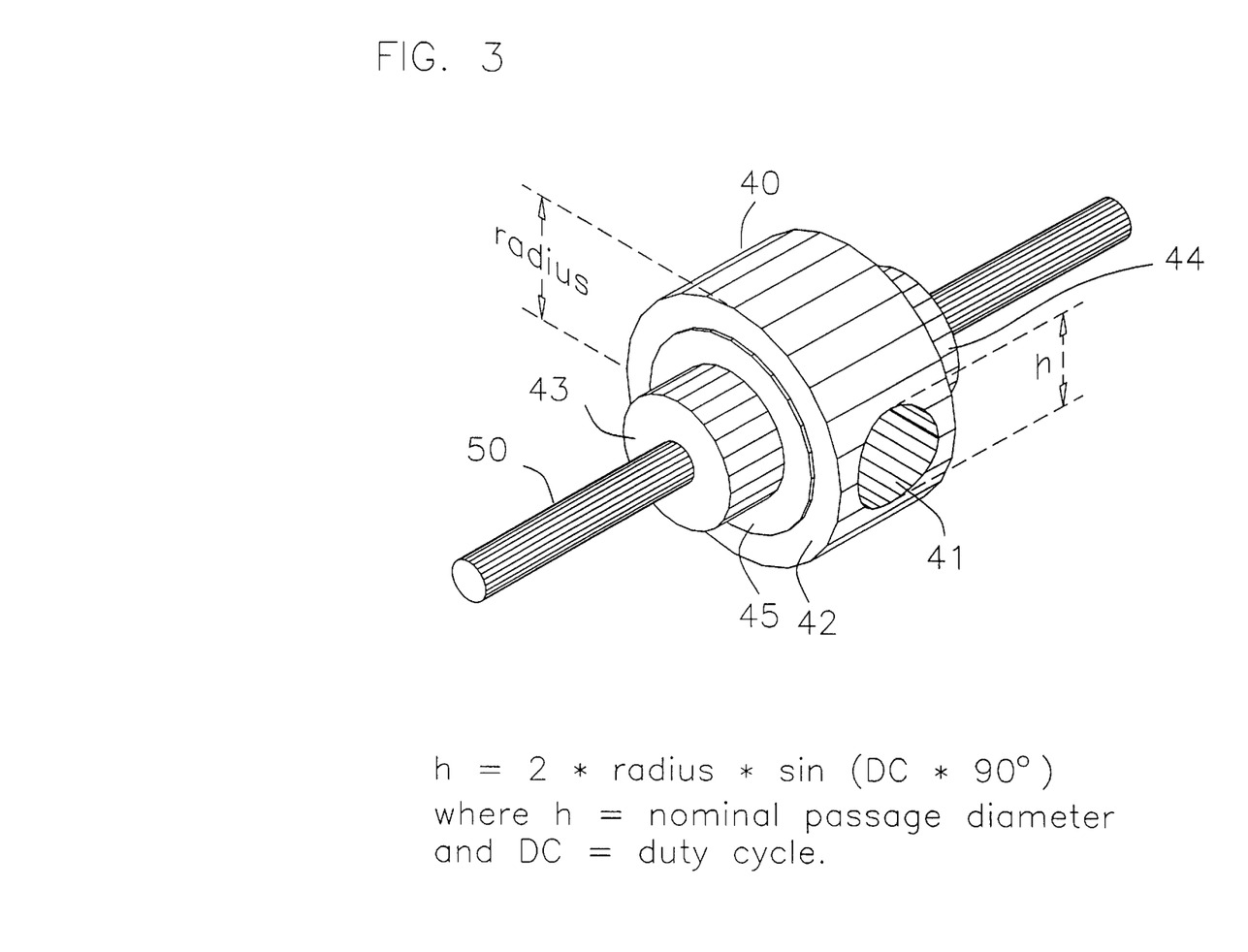
FIG. 3 is an isometric view showing an insert of the valve of a preferred embodiment of the present invention.
Figure 4:
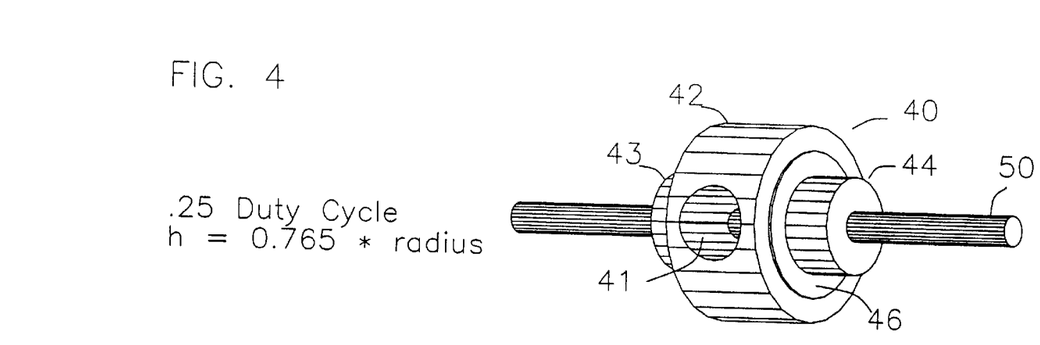
FIG. 4 is another isometric view showing an insert of FIG. 3.

The end cap 20 includes a centered hole 21 for the shaft 50, and three or more holes 22 through which screws 23 (or other fastening means) attach it to the valve housing 70, via holes 72. The inside of the cap 20 includes an O-ring seal (though the O-ring is not shown, the groove 24 in cap 20 is shown in FIG. 2).

The bearings and optional seals can be made of a variety of materials depending upon the intended application of the valve. In some drying applications components (bearings and seals) designed for high temperature applications may be chosen. In such applications, the nominal clearances between the insert and housing should be increased (to, for example, 0.15 to 0.30 mm) to allow for the increased thermal expansion.

The shaft 50 can be made of traditional shaft steel stock material and is sufficiently long so that it extends out of the valve cap 20 and/or housing 70 enough to allow for the required coupling with other valves or the drive system.

The valve insert 40 itself can be designed to produce a wide range of duty cycles. The duty cycle is determined by the size of the passage 41 (which could be milled out, for example, or formed in a molding process if insert 40 is molded) in the insert 40. In FIG. 1 the shaft 50 is a solid piece of material passing through the valve insert. It therefore presents a minor obstruction in the passage. An alternative design could incorporate a modification where the shaft and the insert are a single piece of material and the shaft does not pass through the opening passage of the insert. The material chosen for the valve insert 40 can be the same as the housing 70 and cap 20 material, although it can be advantageous to choose a low friction material such as Delrin™ brand acetyl resin plastic or Teflon® brand polytetrafluoroethylene so that any minor misalignment or thermal/mechanical expansion will result in only low friction contact between the insert 40 and the housing 70.

Insert 40 includes a section 42 of relatively large diameter, two sections 43 and 44 of relatively smaller diameter, and two very narrow sections 45 and 46 of intermediate diameter. The narrow sections 45 and 46 are included as spacers such that the stationary outer races of bearings 30 and 60 do not contact the rotating insert 42. The diameters of sections 43 and 44 are advantageously, though not necessarily, the same. Sections 43 and 44 are received in bearings 30 and 60, respectively.

The valve housing 70 is a cylindrical piece with a solid surface 77 at one end and an opening 71 for the valve insert 40 and cap 20 at the other end. Along the circumference of the valve housing are an inlet opening 73 and an outlet opening 74 located 180 degrees apart. Additional threaded holes 76 in the housing 70 are for set screws 78 to fix the bearings in place.

It is possible to implement a variation of this valve using multiple inlets and outlets along the valve circumference or along an elongated axial dimension.

A hole 75 allows shaft 50 to protrude from the solid surface 77 of the housing 70.

Figure 5:
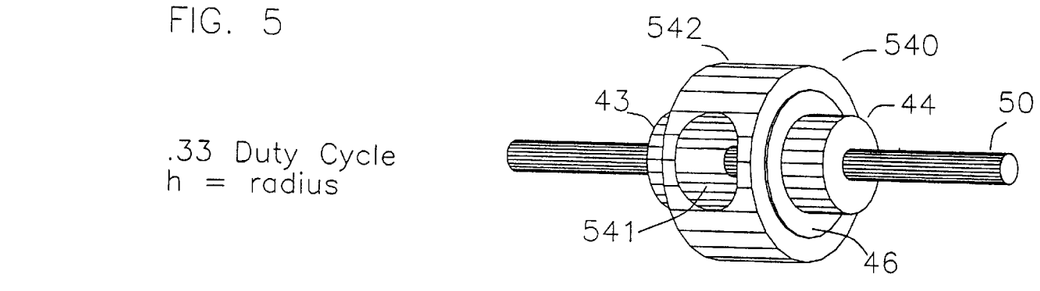
FIG. 5 is an isometric view showing an insert of the valve of a preferred embodiment of the present invention.
Figure 6:
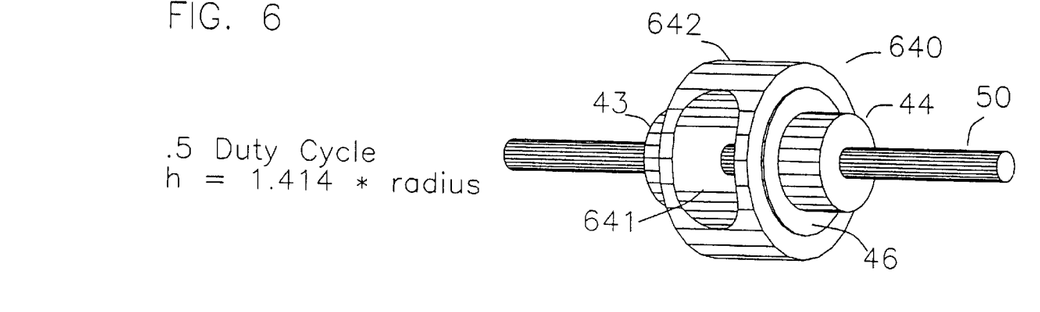
FIG. 6 is an isometric view showing the insert of the valve of a preferred embodiment of the present invention.

The duty cycle of the valve 10 having insert 40 therein is 0.25. When insert 540 (having a large diameter section 542 and a flow passage 541) is used, the duty cycle of the valve is 0.33 (see FIG. 5). When insert 640 (having a large diameter section 642 and a flow passage 641) is used, the duty cycle of the valve is 0.5 (see FIG. 6).

Figure 8:
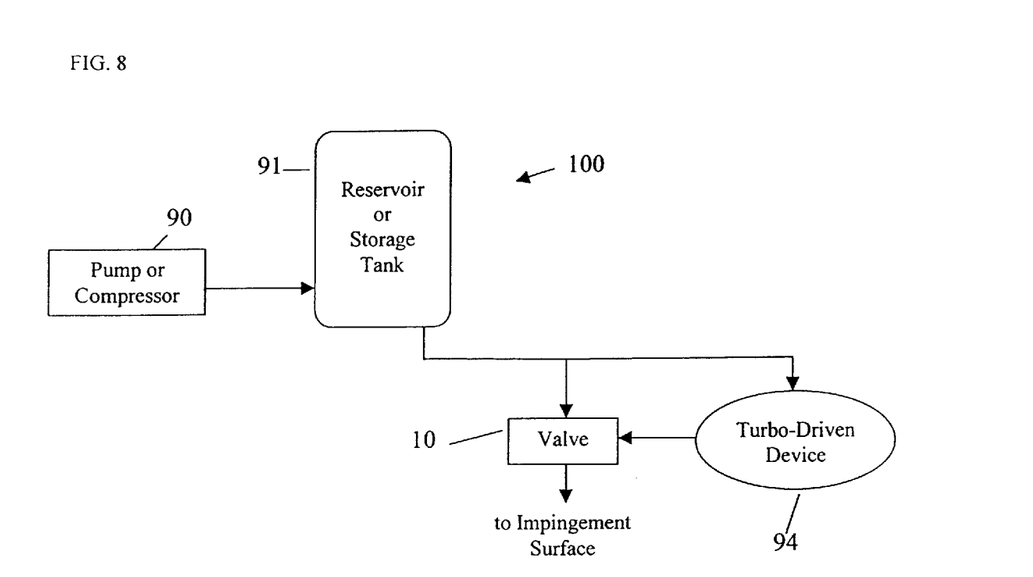
FIG. 8 is a schematic view of a preferred embodiment of the apparatus of the present invention.

FIG. 8 shows a system 100 which includes a pump or compressor 90 for compressing fluid (such as air or gas) which is stored in a reservoir or storage tank 91. The compressed fluid is used to impinge a surface through valve 10 and to turbo-drive device 94 which rotates shaft 50 of valve 10.

Figure 9:
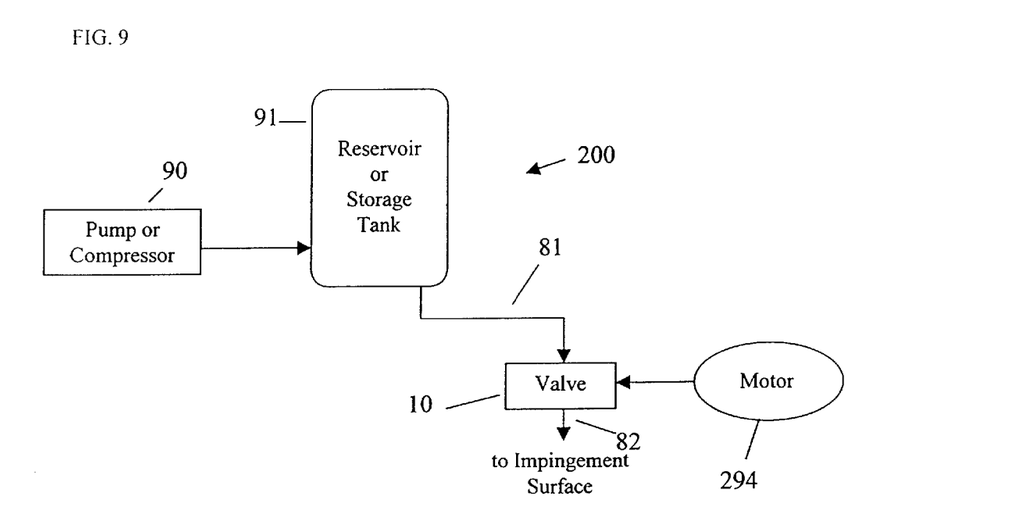
FIG. 9 is a schematic view of an alternative embodiment of the apparatus of the present invention.

FIG. 9 shows a system 200 which includes a pump or compressor 90 for compressing fluid (such as air or gas) which is stored in a reservoir or storage tank 91. The compressed fluid is used to impinge a surface through valve 10. A motor 294 is the driving means for rotating shaft 50 of valve 10.

Figure 10:
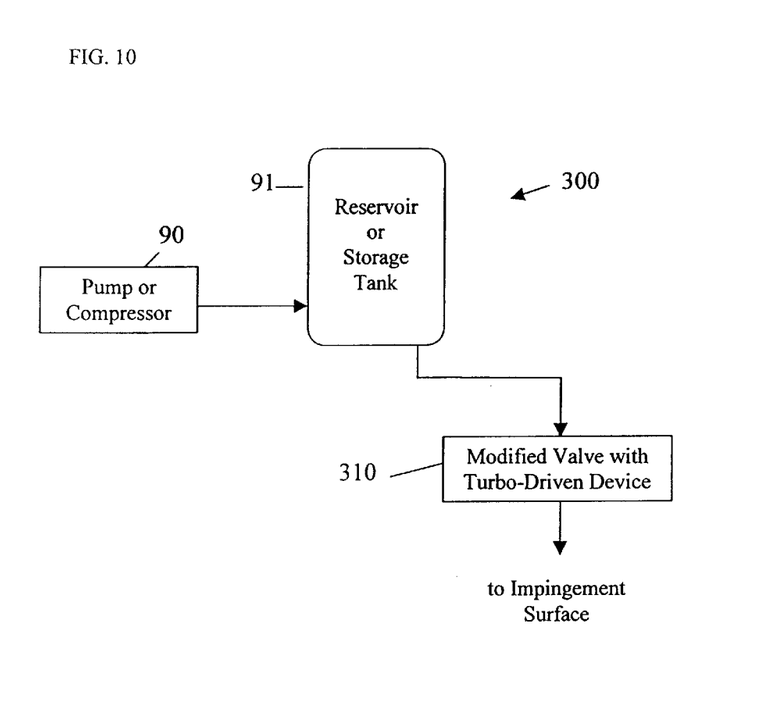
FIG. 10 is a schematic view of another alternative embodiment of the apparatus of the present invention.
Figure 11:
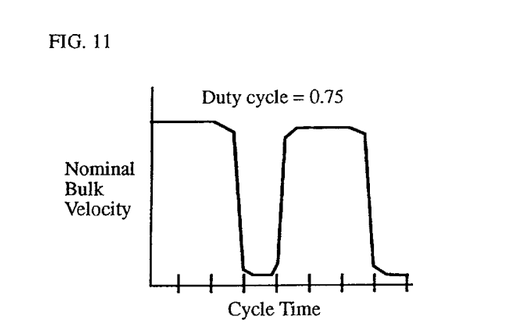
FIG. 11 is a first graph showing duty cycle.
Figure 12:
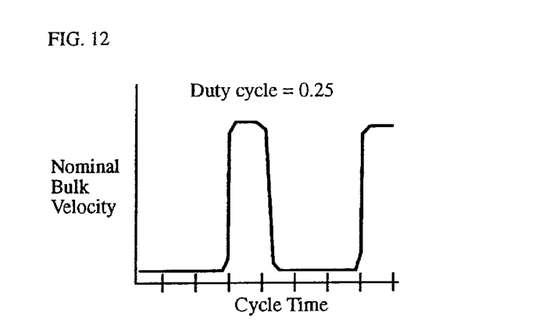
FIG. 12 is a second graph showing duty cycle.

FIG. 10 shows a system 300, similar to systems 100 and 200, in which the compressed fluid is used to impinge a surface through a modified valve with turbo-driven device 310. In system 300 the fluid that is used to rotate the insert is extracted directly from the supply fluid and exhausts onto the impingement surface with the fluid that passes through the valve insert 40. The idea is that a single fluid line could be connected to one embodiment of the design such that this single fluid line is used both for driving the valve and to produce the impingement flow. In system 100 the fluid that drives the turbo-driven device is not recovered.

Figure 7:
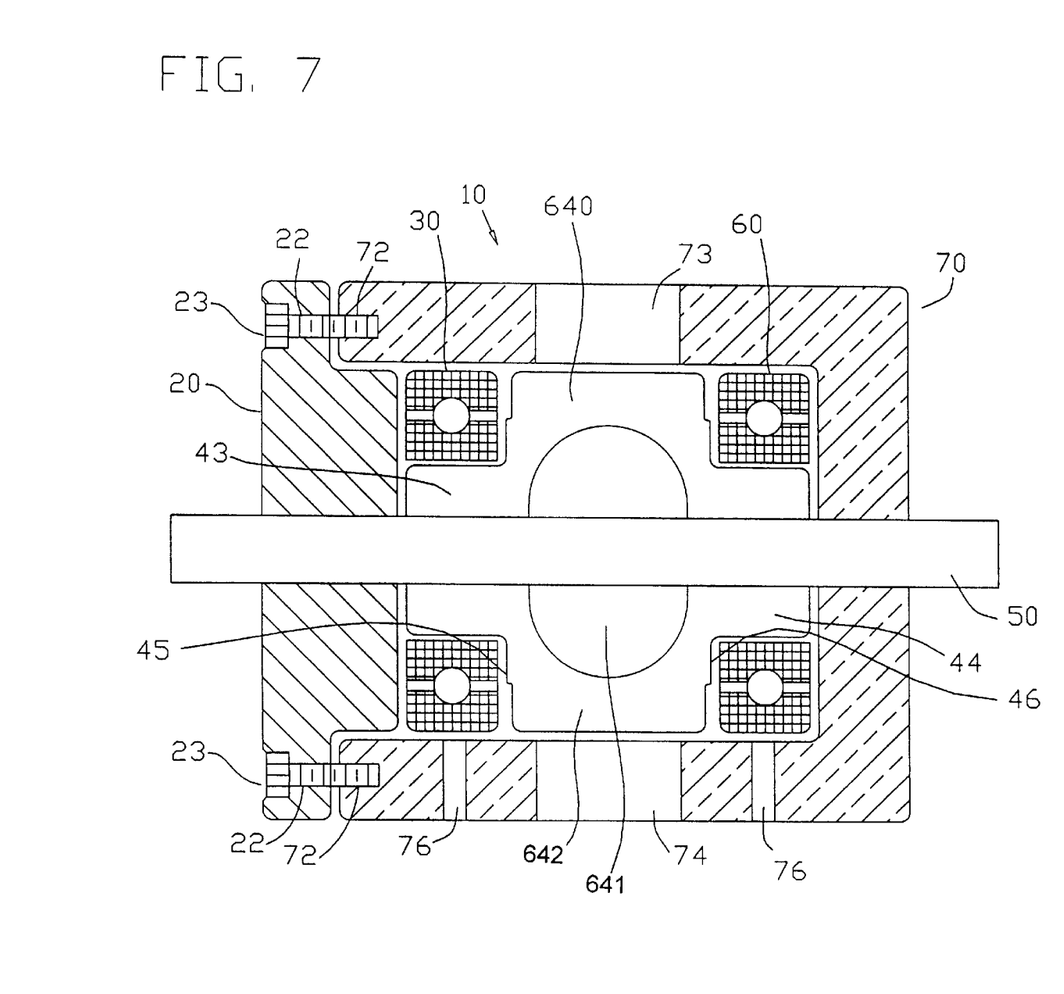
FIG. 7 is a cross-sectional view showing the valve of a preferred embodiment of the present invention.

In operation (see FIGS. 1, 2, and 9), valve 10 is assembled as shown in FIGS. 1 and 2. The insert could be press fit onto shaft 50. Insert 40 could be used, or inserts 540, 640, or some other insert which will produce a desired duty cycle for the particular application. A pump 90 (see FIG. 9) compresses air which is stored in a storage tank 91. A fluid line 81 runs from the storage tank 91 to the fluid inlet 73 (see FIGS. 1 and 2) of valve 10. Fluid outlet 74 could have an optional fluid line 82 attached thereto, unless the valve is positioned directly over the impingement surface and is at the desired distance therefrom. Fluid lines 81 and 82 are attached to the valve 10 in any conventional manner, such as via threaded holes or press-fit inserts into 73 and 74. Motor 294 is operatively connected to shaft 50 (see FIG. 7, which shows shaft 50 protruding from housing 70). Motor 294 is run at a speed to produce the desired frequency. As insert 40 rotates, it intermittently interrupts the flow of air from tank 91 through fluid line 81, thus converting an otherwise steady flow of air onto the impingement surface into a pulsed flow.

Although not shown, it is possible to make an elongated insert with a plurality of inlets and outlets arranged along the axial dimension of the insert, and corresponding inlet and outlet ports along the axis of an elongated valve housing. This would enable a single motor to easily control a plurality of jets of fluid.

Parts List

The following is a list of parts and materials suitable for use in the present invention:

10 valve of a preferred embodiment of the present invention
20 end cap of valve 10 (made of, for example, aluminum, steel, or Delrin brand acetyl resin)
21 centered hole in cap 20
22 fastening holes in cap 20
23 screws
24 O-ring groove in cap 20
30 bearing (may be Series R extra small and extra light double seal ball bearings commercially available from NTN, or a similar bearing)
40 valve insert (made of, for example, Delrin brand acetyl resin, Teflon® brand polytetrafluoroethylene, aluminum, or steel)
41 passage
42 section 42 of relatively large diameter
43 section of relatively smaller diameter
44 section of relatively smaller diameter
45 very narrow sections of intermediate diameter
46 very narrow sections of intermediate diameter
50 shaft (made of, for example, any appropriate shaft steel)
60 bearing (may be Series R extra small and extra light double seal ball bearings commercially available from NTN, or a similar bearing)
70 housing of valve 10 (made of, for example, aluminum, steel, or Delrin)
71 opening
72 holes
73 inlet opening
74 outlet opening
75 shaft opening
76 threaded holes
77 solid surface of the housing 70
78 set screws (for fixing bearings 30 and 60 in place relative to the valve housing 70)
81 flow line
82 flow line
90 pump or compressor for compressing fluid
91 reservoir or storage tank
94 turbo-drive device
100 mass and/or heat transfer system
200 mass and/or heat transfer system
294 motor
300 mass and/or heat transfer system
310 modified valve with turbo-driven device
540 insert 540
541 flow passage
542 large diameter section
640 insert
641 flow passage
642 large diameter section The driving means can drive the valve at a frequency of 1–200; preferably 20–100, and most preferably 35–70. This is based on practical limitations as well as preliminary results. Special cases outside of these preferred ranges are expected.

Nominal clearances between the insert and housing: preferably 0.05–0.3 mm; more preferably 0.1 to 0.2 mm; and most preferably 0.12 to 0.18 mm.

The duty cycle of the valve is preferably 0.2–0.8, more preferably 0.2–0.6; most preferably 0.25 to 0.5. Additional testing may reveal special cases outside these ranges.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

We claim:

1. A valve apparatus comprising:
    a) a valve body having a cavity, a fluid stream inlet, and a fluid stream outlet;
    b) a generally cylindrically shaped movable insert with a curved wall, said insert received within the valve body, the insert defining a rotating valving member insert that controls the flow of fluid as fluid passes from the fluid stream inlet to the fluid stream outlet;
    c) the insert having a flow passage extending between opposing positions on the curved wall of the insert, and said insert being of a shape and orientation to provide a desired duty cycle of the valve.

2. The apparatus of claim 1, wherein the fluid is a liquid.

3. The apparatus of claim 1, wherein the fluid is a gas.

4. The apparatus of claim 1, further comprising a driver for driving the valving member insert, said driver including a motor and a shaft for operatively coupling the motor and the valving member insert.

5. The apparatus of claim 1, further comprising a driver for driving the valve including an air tool which derives its rotational power from a secondary air supply system and means for operatively coupling the air tool and the valve.

6. The apparatus of claim 1, wherein the fluid is air, and further comprising driving means for driving the valve including an air tool which derives its rotational power from an air supply system which provides the air for the jet, and means for operatively coupling the air tool and the valve.

7. The apparatus of claim 1, further comprising driving means for driving the valve including an external hydraulic drive and means for operatively coupling the external hydraulic drive and the valve.

8. The apparatus of claim 1, further comprising driving means for driving the valve including an integral hydraulic drive and means for operatively coupling the integral hydraulic drive and the valve.

9. The apparatus of claim 1, further comprising driving means to drive the valve at a frequency of 1–200.

10. The apparatus of claim 1, further comprising driving means to drive the valve at a frequency of 20–100.

11. The apparatus of claim 1, further comprising driving means to drive the valve at a frequency of 35–70.

12. The apparatus of claim 1, wherein the duty cycle of the valve is between about 0.2–0.8.

13. The apparatus of claim 1, wherein the duty cycle of the valve is between about 0.2–0.6.

14. The apparatus of claim 1, wherein the duty cycle of the valve is between about 0.25 to 0.5.

15. The apparatus of claim 1, wherein the flow passage allows the fluid stream to flow through the valving member insert when the flow passage is aligned with both the inlet and the outlet.

16. Apparatus comprising an array of a plurality of the valves of claim 1.

17. The apparatus of claim 16, wherein at least some of the valves are out of phase with one another.

18. Apparatus for transferring mass and/or heat including a valve for a stream of fluid impinged upon a surface, the stream having a temporal jet velocity profile, the valve precisely pulsing and controlling the temporal jet velocity profile of the stream of fluid, the valve comprising:
    a valve body;
    a fluid stream inlet in the valve body;
    a fluid stream outlet in the valve body;
    a movable insert received within the valve body, the insert controlling flow of fluid as fluid passes from the fluid stream inlet to the fluid stream outlet, the insert having a flow passage of a shape and orientation to provide a desired duty cycle of the valve further comprising a plurality of interchangeable movable inserts for the valve body, the interchangeable movable inserts each having a flow passage of a shape and orientation to provide a desired duty cycle of the valve.

19. The apparatus of claim 1, wherein the valving member insert rotates within the valve body.

20. The apparatus of claim 19, further comprising motor means for rotating the insert in the valve body.

21. Apparatus including a valve for a stream of fluid impinged upon a surface, the stream having a temporal jet velocity profile, the valve precisely pulsing and controlling the temporal jet velocity profile of the stream of fluid, the valve comprising:
    a valve body;
    fluid stream inlet means on the valve body;
    fluid stream outlet means on the valve body;
    a rotatable insert valving member received within the valve body and rotatable about an axis of rotation, the insert valving member controlling flow of fluid as fluid passes from the inlet means to the outlet means, the insert valving member having a generally linear flow passage of a shape and orientation to provide a desired duty cycle of the valve and extending through the valving member insert along a line that is generally transverse to the axis of rotation.

22. Apparatus including:
    a valve for a stream of fluid impinged upon a surface, the stream having a temporal jet velocity profile, the valve precisely pulsing and controlling the temporal jet velocity profile of the stream of fluid, the valve comprising:
        a valve body;
        a fluid stream inlet in the valve body;
        a fluid stream outlet in the valve body; and
        a first movable insert received within the valve body and rotatable about an axis of rotation, the first movable insert controlling flow of fluid as fluid passes from the fluid stream inlet to the fluid stream outlet, the insert having a flow passage generally perpendicular to the axis of rotation and of a shape and orientation to provide a first desired duty cycle of the valve; and
    a plurality of additional movable inserts, the additional movable inserts each having a flow passage of a shape and orientation to provide a desired duty cycle of the valve.

23. Apparatus including:
    a plurality of movable inserts, the movable inserts each having a flow passage of a shape and orientation to provide a desired duty cycle of a valve in which they are received, the movable inserts being receivable in a valve for a stream of fluid impinged upon a surface, the stream having a temporal jet velocity profile, the valve precisely pulsing and controlling the temporal jet velocity profile of the stream of fluid, the valve comprising:
        a valve body;

a fluid stream inlet in the valve body;

a fluid stream outlet in the valve body; and a first movable insert received within the valve body and rotatable about an axis of rotation, the first movable insert controlling flow of fluid as fluid passes from the fluid stream inlet to the fluid stream outlet, the insert having a flow passage generally perpendicular to the axis of rotation and of a shape and orientation to provide a first desired duty cycle of the valve.

24. A rotary pulsating valve apparatus including:

a movable insert, the movable insert having a flow passage of a shape and orientation to provide a desired duty cycle of a valve in which it is received, the movable insert being receivable in a valve for a stream of fluid impinged upon a surface, the stream having a temporal jet velocity profile, the valve precisely pulsing and controlling the temporal jet velocity profile of the stream of fluid, the valve comprising:

a valve body;

a fluid stream inlet in the valve body;

a fluid stream outlet in the valve body; and the movable insert, wherein when the movable insert is received within the valve body and rotatable about an axis of rotation, the movable insert controls flow of fluid as fluid passes from the fluid stream inlet to the fluid stream outlet along a path that is transverse to the axis of rotation.

25. Apparatus for transferring mass and/or heat including a valve for a stream of fluid impinged upon a surface, the stream having a temporal jet velocity profile, the valve precisely pulsing and controlling the temporal jet velocity profile of the stream of fluid, the valve comprising:

a) a valve body having a cavity, and a fluid stream inlet and a fluid stream outlet;

b) a movable insert with a curved wall, said insert received within the valve body, the insert defining a rotating valving member insert that controls the flow of fluid as fluid passes from the fluid stream inlet to the fluid stream outlet;

c) the insert having a flow passage extending between opposing positions on the curved wall and said insert of a shape and orientation to provide a desired duty cycle of the valve.

26. The apparatus of claim 25 wherein the opposing positions are about 180 degrees apart.

* * * * *